May 6, 1924.
S. LAKE
1,492,641
METHOD OF AND APPARATUS FOR WELDING
Filed Dec. 3, 1919      3 Sheets-Sheet 1
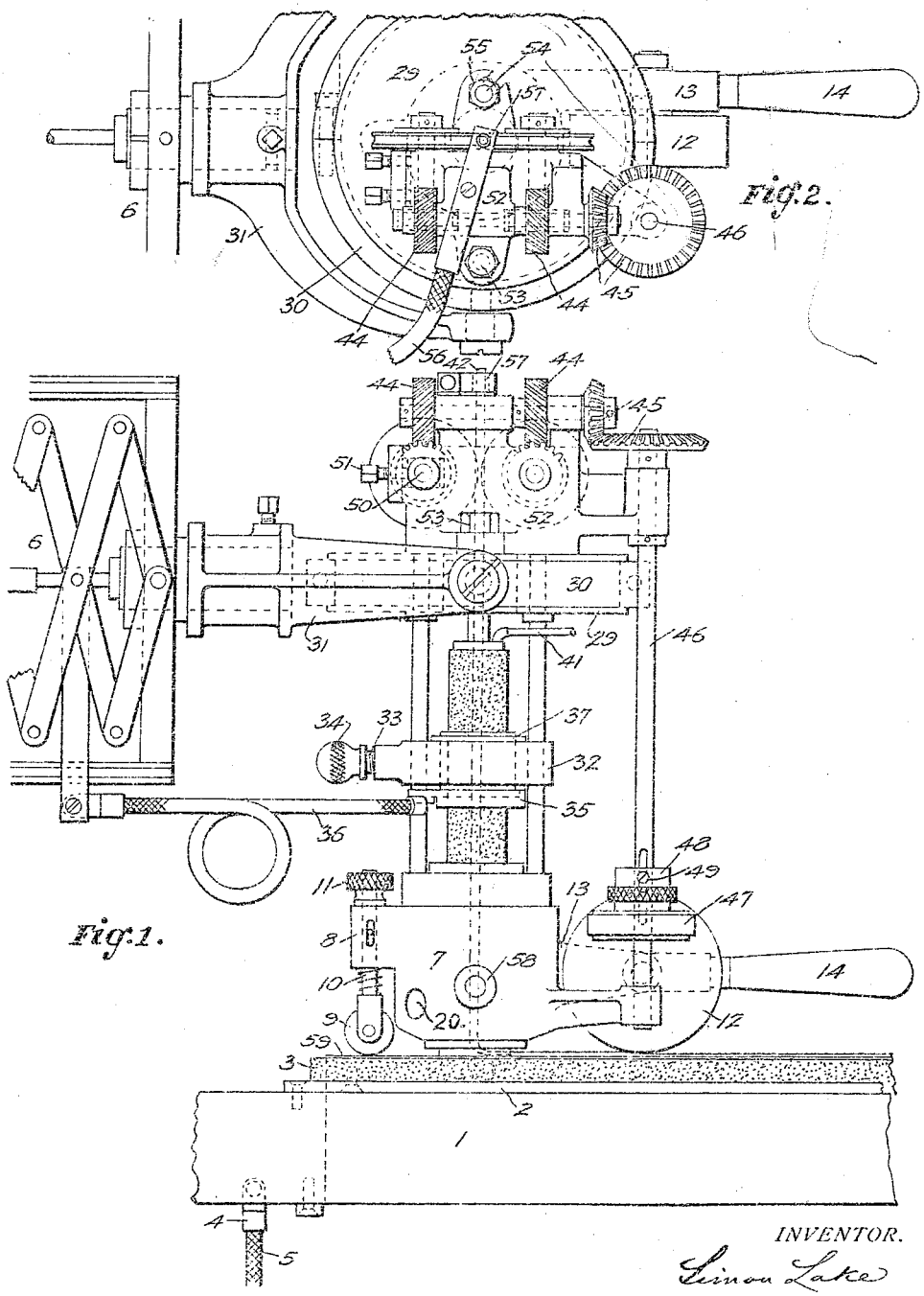
INVENTOR.
Simon Lake
BY
ATTORNEY.

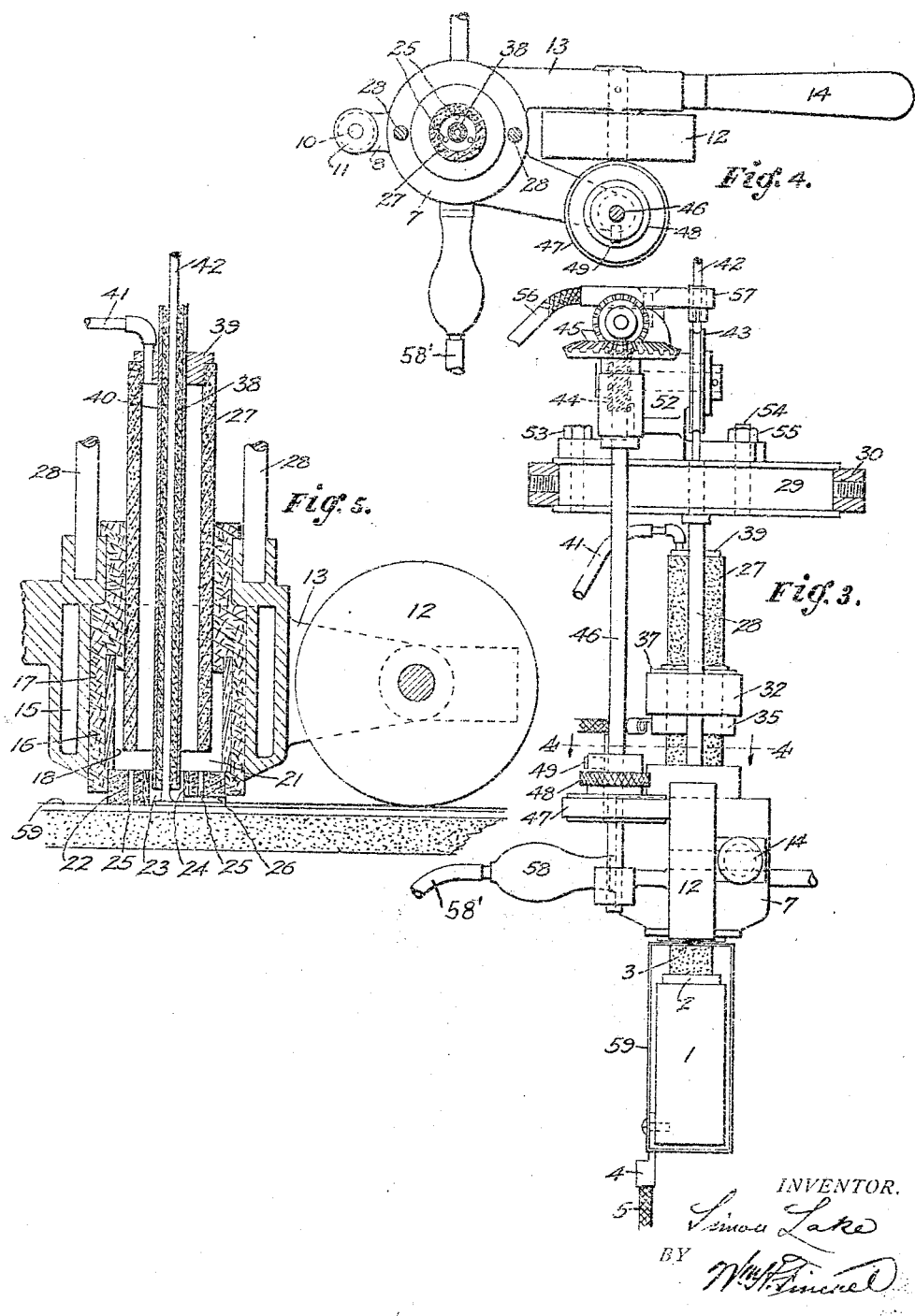

May 6, 1924.  
S. LAKE  
1,492,641  
METHOD OF AND APPARATUS FOR WELDING  
Filed Dec. 3, 1919  3 Sheets-Sheet 3
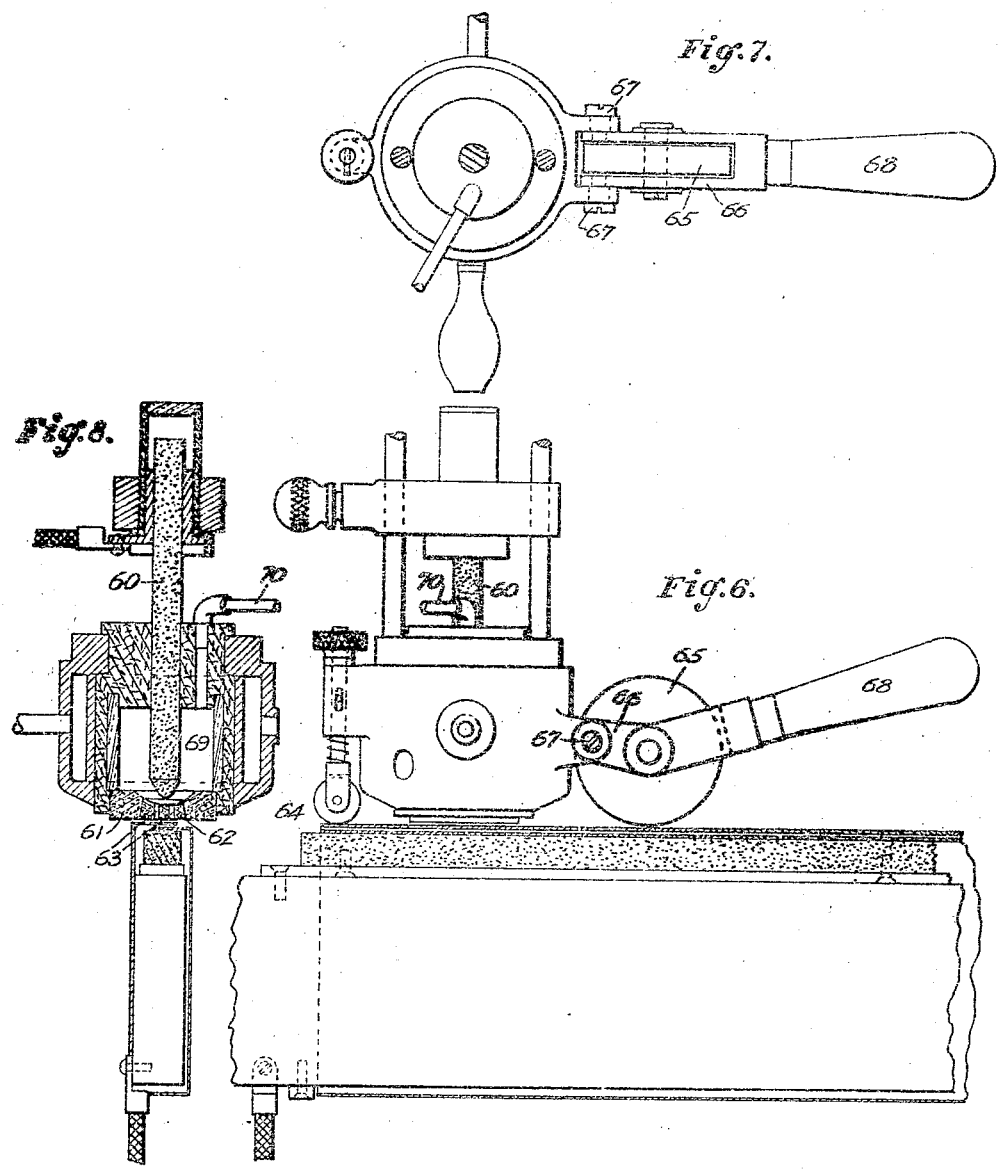
INVENTOR.  
Simon Lake  
BY  
ATTORNEY.

Patented May 6, 1924.

1,492,641

UNITED STATES PATENT OFFICE.

SIMON LAKE, OF MILFORD, CONNECTICUT.

METHOD OF AND APPARATUS FOR WELDING.

Application filed December 3, 1919. Serial No. 342,129.

*To all whom it may concern:*

Be it known that I, SIMON LAKE, a citizen of the United States, residing at Milford, in the county of New Haven and State of Connecticut, have invented a certain new and useful Improvement in Methods of and Apparatus for Welding, of which the following is a full, clear, and exact description.

This invention relates to a method of and apparatus for welding and it is particularly adapted to the welding of tubular structures.

One object of the invention is to provide for welding tubular or other structures in a rapid and efficient manner.

Another object is to provide for the welding of tubular or other structures by either the butt or lap-joint type of weld.

It will be obvious that although the embodiment of the invention as herein set forth is directed to the welding of tubular structures, its use is not so limited for, as is evident, it is well adapted to butt or lap welding of plates or the like.

The invention consists broadly, in a method of welding whereby the parts to be welded are placed in proper relative position, heated to a welding temperature and then subjected to pressure, either with or without the employment of a welding medium, and in the apparatus for carrying out this method, all as I will proceed now to explain and finally claim.

In the accompanying drawings illustrating the invention, in the several figures of which like parts are similarly designated, Figure 1 is a side elevation of one form of apparatus for utilizing my method; Fig. 2 is a fragmentary top plan view of same; Fig. 3 is an end view looking from the right-hand side of Fig. 1; Fig. 4 is a section taken in the plane of line 4—4, Fig. 3, Fig. 5 is a fragmentary central vertical section of parts of this form of apparatus illustrating the mode of operation of same. Fig. 6 is a partial side view of a modified form of apparatus. Fig. 7 is a top view of the apparatus of Fig. 6; and Fig. 8 is a sectional elevation of the parts shown in Fig. 6 illustrating the method of operation.

The apparatus shown in Figs. 1 to 5 comprises a work support or horn 1 of steel or other suitable material capable of being electrically energized, provided with a collector strip 2 of copper or the like metal of high conductivity, which in turn carries a carbon strip electrode 3 upon which the work is immediately supported. The horn 1 is provided with any suitable stand or supporting means (not shown) and has a connection 4 for an electric cable or the like conductor 5.

Supported for operating adjustment in relation to the horn 1 by means of an extensible carrier-arm 6, which forms the subject matter of my application Serial No. 257819, filed October 11, 1918, and patented March 30, 1920, No. 1,335,512, is a heating tool provided with a heating element or furnace-head 7 carrying in an extension 8 a relatively movable, spring-pressed roller 9, the supporting member 10 of which is capable of adjustment for length of movement in one direction by means of a thumb or knurled nut 11.

Carried by the head 7 at a point diametrically opposite the roller 9 is a roller or wheel 12 supported on an arm 13 provided with a handle 14 by means of which the head and roller may be guided and held in operative relation to the work.

Referring particularly to Fig. 5, the head 7 is water-jacketed as shown at 15 and provided with a lining 16 of refractory non-electrical-conducting material 17, and a substantially transparent refractory member 18 having communication with sight openings 20 in the head, whereby conditions in the furnace-chamber 21 may be viewed by the operator. The lining 16 is extended beyond the ends of the head 7 and is provided at one end with a disc 22 of carbon or other suitable material having a central opening 23 provided with an insulating bushing 24, and surrounding openings 25, and, further, the disc is cut away at one side to form a groove 26, all for a purpose hereinafter appearing. Entering into the head 7 and having a substantially gas-tight sliding fit in the other end of the lining 16 is an electrode 27 of carbon or other suitable material supported by and slidingly adjustable upon rods 28 carried by a gimbal 29 mounted in a gimbal-ring 30, which is pivoted in a yoke 31 carried by the arm 6. The other ends of these rods 28 are fixed in and serve as supports for the head. The electrode 27 is maintained in suitable adjustment with relation to the head by means of a member 32 surrounding the electrode and slidable on the rods 28 and provided with a set-screw 33 having an adjusting knob 34. This member 32 is connected with the electrode 27 by means of a ring 35 which furnishes electrical connection between a conductor or cable 36 and the electrode, but this ring is insulated from the member 32 by a bushing 37.

Mounted substantially centrally within the electrode is a tube 38 of carbon or the like conducting material supported by a plug 39 threaded or otherwise secured in the end of electrode 27, and this tube 38 extends into the opening 23 in disc 22, as shown, and may be provided with an insulating covering 40, if desired.

An inlet 41 for air or suitable gas, under pressure, extends through the plug 39.

The tube 38 is adapted to receive a welding rod or wire 42, arranged to be fed therethrough by grooved friction-rollers 43, driven by gearing 44, 45 from a shaft 46 carrying a friction roller 47 which engages the roller 12 so as to be driven thereby, and is adjustable with relation to the center thereof by means of a hub 48 and set-screw 49 engaging the shaft 46, whereby the rate of feed of the rod 42 may be measured in relation to the rate of travel of the heating element or furnace-head 7 over the work.

The journals 50 of one of the rollers 43 may be provided with means 51 for adjusting one roller with relation to the other so as to increase or decrease the amount of friction between the rollers 43 and the rod or wire 42, and to compensate for wear.

The rollers 43 and their gearing 44 are carried by a head 52 having a pivotal action around the shaft 46 as a center, and held in operative relation to the rod 42 by means of screw 53 and stud bolt 54 and nut 55. This movement of the head 52 is provided for so as to permit of replacement of electrodes etc.

Electric current is supplied to the rod 42 through a cable or conductor 56 connected with a contact member 57 with which the rod makes sliding contact.

For convenience in operating, the head 7 is provided with a handle 58 in addition to the handle 14, and this handle 58 may be utilized as a means for introducing cooling water into the jacket 15 by connection therewith of a hose 58', see Figs. 3 and 4.

The operation of this form of the invention is substantially as follows:—

The structure to be welded, say a rectangular tube 59, as shown in Fig. 3, is slipped over the horn 1 and its edges brought into proper relation to form a butt-joint. The heater 7 is then brought in contact with the thus supported and positioned tube and the current switched on. Then the electrode 27 is moved forward by means of knob 34 until its end touches disc 22. This will establish a circuit through the electrode 27, disc 22, tube 38 and horn 1 and when electrode 27 is now moved out of contact with disc 22 an arc will be formed between these two parts and intense heat will be generated in furnace chamber 21 from which it will be forced by pressure of the gas entering through inlet 41, through the openings 25 and against the parts to be welded, quickly heating them to a welding temperature. Meantime the tube 38 has been heated to such a temperature as to cause rod 42 to become plastic. The head may now be moved along the joint, the roller 9 pressing the edges of the parts upon the horn, the heater raising the temperature of these parts to the welding heat, the feed mechanism forcing the plastic rod upon the joint and the roller 12 applying pressure to the heated parts and applied plastic material to form an intimate union of them thereby producing a continuous homogeneously welded seam of the edges of the parts; this seam taking approximately the T form in cross-section shown in Fig. 3.

It will be evident, from reference particularly to Fig. 5, that the groove 26 permits the heater to be moved in one direction without disturbing the deposited plastic metal.

By using a carbon strip 3 for an electrode on the horn 1, welding or sticking of the parts to be welded to the electrode, as is the case where metal electrodes are used, is avoided.

In Figs. 6 to 8, I show a heater so modified as to adapt the invention to lap-welding. In this case the heater is provided with an adjustable electrode 60 adapted to form an arc by cooperation with a disc 61 having a replaceable center-piece 62 provided with openings 63. This heater has a roller 64 like the roller 9 above described, but the roller 65 corresponding to roller 12, is mounted for movement relative to the heater by means of a yoke 66 in which the roller is journalled and which is pivoted to the head at 67 and is provided with a handle 68.

Compressed air or gas is supplied to the furnace-chamber 69 through an inlet 70.

In the operation of this form of the invention the tube or other structure is mounted on the horn with its ends lapped as shown in Fig. 8 and the heat is projected upon the thus lapped parts through the openings 63. When a welding temperature has been attained the heater is moved forward and pressure is applied by manipulation of the roller 65 as will be apparent.

It will be understood that instead of using the electric arc to generate the welding heat, a gas flame, such as the oxy-acetylene, or oxy-hydrogen flame might be used, but I prefer the electric arc because of its simplicity and the reduced cost.

It is obvious that the invention is not limited in its application to the specific constructions shown and method of operation described, as various changes therein are deemed to be within the spirit of the invention and the scope of the following claims.

What I claim is:—

1. A method of welding, consisting in arranging the parts to be welded in proper welding relation, heating said parts to a welding temperature, supplying a welding medium at a welding temperature between said parts, and rolling said parts and medium to form a weld.

2. A method of welding, consisting in arranging the parts to be welded in proper relation upon a non-metallic support, heating said parts to a welding temperature, supplying a welding medium at a welding temperature to said parts, and applying pressure thereto and to said medium to form a weld.

3. A method of welding, consisting in arranging the parts to be welded in proper welding relation upon a non-metallic support, heating said parts to a welding temperature, supplying plastic metal at a welding temperature to said parts, and applying pressure thereto and to said plastic metal, to form a weld.

4. A method of welding, consisting in arranging the parts to be welded in welding relation, applying a movable heating element thereto to raise the temperature thereof to a welding heat and to supply a plastic welding medium, gradually advancing said element along the parts to be welded whereby previously unheated areas are heated, and applying pressure to said heated parts as said element advances.

5. In a welding apparatus, the combination with a support for the parts to be welded, of a movable heating element including a furnace adapted to project heat upon the parts to be welded, means for supplying a welding medium to the parts to be welded, said welding medium passing through said furnace and during such passage assuming a plastic state, and a pressure-applying element associated with said heating element and adapted to apply a welding pressure to the heated parts to be welded and the welding medium to form a weld therebetween.

6. In a welding apparatus, a heating element comprising a furnace adapted to be moved along the joint of the parts to be welded and comprising a furnace adapted to project a heat of welding intensity upon the parts to be welded, means for supplying a welding medium to said parts, said welding medium passing through said furnace to be thereby heated to a welding temperature, and a pressure-applying element associated with said heating element and adapted to follow in the path of said heating element over the parts heated thereby to apply a welding pressure to the parts and the welding medium to form a weld therebetween.

7. In a welding apparatus, a heating element adapted to be moved along the edges of the parts to be welded and to project heat thereupon to raise said parts to a welding temperature, means for supplying a welding medium in proportion to the rate of movement of said heating element along said edges, said welding medium adapted to be heated to a welding temperature by said heating element previous to its application to the parts to be welded, and a pressure-applying element associated with said heating element and adapted to follow in the path thereof to apply welding pressure to the heated edges of the parts to be welded and the supplied welding medium to form a weld therebetween.

8. In a welding apparatus, a heating element adapted to be moved along the edges of the parts to be welded, said heating element comprising a furnace chamber, means for producing intense heat therein, means defining an aperture affording communication whereby the heat generated in said chamber may be projected upon the parts to be welded, and means for producing pressure within said chamber to project the heat upon said parts, whereby said parts may be heated to a welding temperature.

9. In a welding apparatus, a heating element adapted to be moved along the edges of the parts to be welded, said element comprising a furnace chamber, means for generating a welding temperature within said chamber, means for producing pressure in said chamber, means defining an outlet from said chamber whereby the heat generated therein may be forced upon the parts to be welded to raise the temperature of said parts to a welding heat, and a pressure-applying element associated with said heating element and adapted to travel in the path heated by said heating element to apply welding pressure to the parts to be welded.

10. In a welding apparatus, a heating element adapted to be moved along the edges of the parts to be welded, said element comprising a furnace chamber, means adapted to generate intense heat in said chamber, means defining apertures through which said heat may be projected upon the parts to be welded, means including mechanism actuated by movement of said element for feeding a welding medium to the parts to be welded, said welding medium during such feeding passing through said furnace chamber and being therein heated to a welding temperature, and a pressure applying element associated with said heating element and adapted to travel in the path of movement of said heating element to apply welding pressure to the parts to be welded and said welding medium to form a weld therebetween.

In testimony whereof I have hereunto set my hand this 1st day of December A. D. 1919.

SIMON LAKE.

Witnesses:
W. H. FINCKEL, Jr.,
LUCY B. McLAUGHLIN.